(12) United States Patent
Capri

(10) Patent No.: US 9,055,183 B1
(45) Date of Patent: Jun. 9, 2015

(54) METHOD AND APPARATUS FOR DETECTION OF PATTERNS AND EDGES WITH UN-CALIBRATED DEVICES

(71) Applicant: Marvell International Ltd., Hamilton (BM)

(72) Inventor: Sandra Capri, Boise, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/150,371

(22) Filed: Jan. 8, 2014

Related U.S. Application Data

(60) Provisional application No. 61/750,195, filed on Jan. 8, 2013.

(51) Int. Cl.
| | |
|---|---|
| H04N 1/60 | (2006.01) |
| H04N 1/46 | (2006.01) |
| G06K 9/00 | (2006.01) |
| H04N 1/047 | (2006.01) |
| H04N 1/00 | (2006.01) |

(52) U.S. Cl.
CPC ............ *H04N 1/047* (2013.01); *H04N 1/00013* (2013.01); *H04N 1/00045* (2013.01); *H04N 1/00063* (2013.01)

(58) Field of Classification Search
None
See application file for complete search history.

(56) References Cited

U.S. PATENT DOCUMENTS

| | | | | |
|---|---|---|---|---|
| 5,642,192 | A * | 6/1997 | Gordon et al. | 356/328 |
| 6,270,178 | B1 * | 8/2001 | Wada et al. | 347/7 |
| 6,552,829 | B1 * | 4/2003 | Maciey et al. | 358/509 |
| 7,477,420 | B2 * | 1/2009 | Friedman et al. | 358/1.9 |
| 7,522,306 | B2 * | 4/2009 | Andersen et al. | 358/1.9 |
| 7,933,043 | B2 * | 4/2011 | Matsuzawa et al. | 358/1.9 |
| 8,368,928 | B2 * | 2/2013 | Kuwahara | 358/1.15 |
| 8,384,950 | B2 * | 2/2013 | Kuwahara | 358/1.9 |
| 2002/0067359 | A1 * | 6/2002 | Brodsky et al. | 345/440 |
| 2002/0164066 | A1 * | 11/2002 | Matsumoto | 382/154 |
| 2003/0001076 | A1 * | 1/2003 | Brandenberger et al. | 250/208.1 |
| 2004/0042022 | A1 * | 3/2004 | Friedman et al. | 358/1.9 |
| 2007/0051161 | A1 * | 3/2007 | Friedman et al. | 73/10 |
| 2009/0325816 | A1 * | 12/2009 | Mirkin et al. | 506/15 |
| 2011/0007371 | A1 * | 1/2011 | Yip et al. | 358/504 |
| 2011/0016437 | A1 * | 1/2011 | Scherubl et al. | 716/52 |
| 2011/0167913 | A1 * | 7/2011 | Bennahmias et al. | 73/606 |
| 2012/0218437 | A1 * | 8/2012 | Hermary et al. | 348/222.1 |

* cited by examiner

*Primary Examiner* — Madelein Nguyen

(57) ABSTRACT

Methods of determining a known location of a sensor head in a scanner without the use of contact sensors are described. Upon initialization of a scanner, the sensor head is moved rapidly to quickly detect a known pattern at a known location in the scanner. As the scan head is moved, windows moving along lines of pixels detected by the sensor head are used to perform pixel averaging to detect the known pattern in the scanner. Parameters associated with the windows custom fit the windows to the known pattern to facilitate rapid detection of the known pattern and determine a known location of the scan head to facilitate calibration of the scanner.

20 Claims, 8 Drawing Sheets

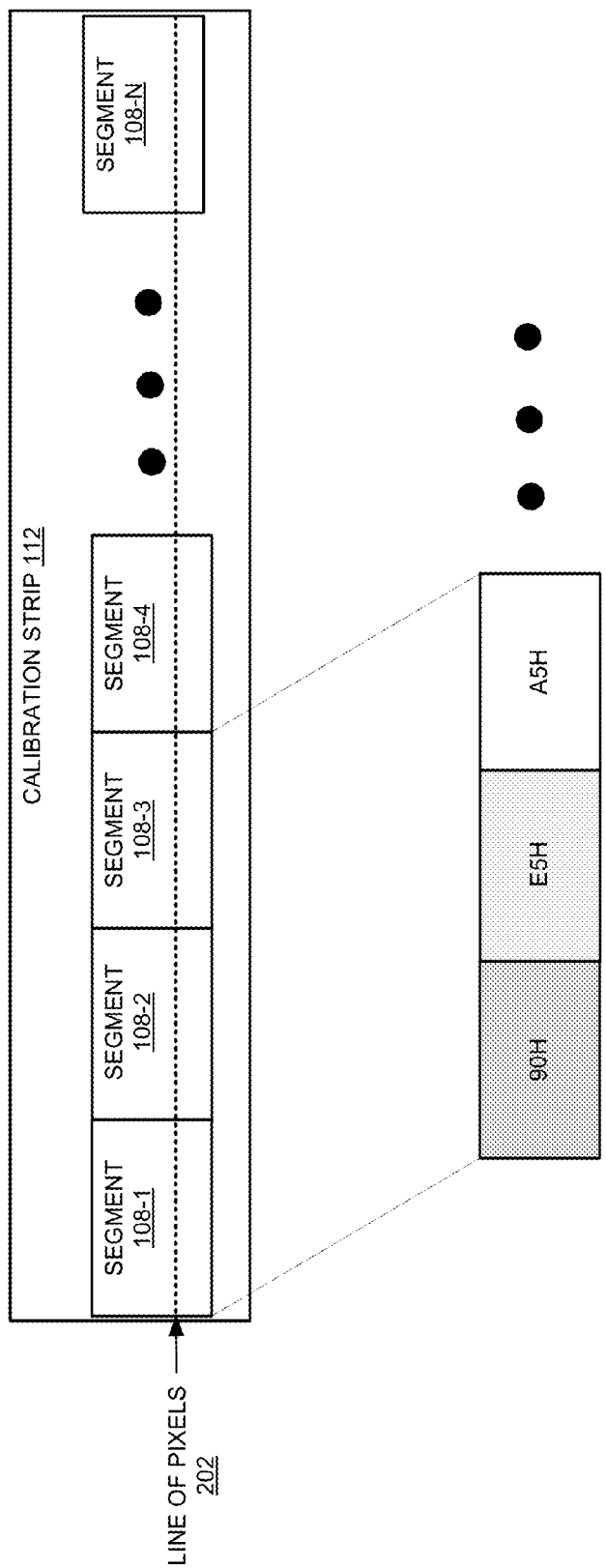

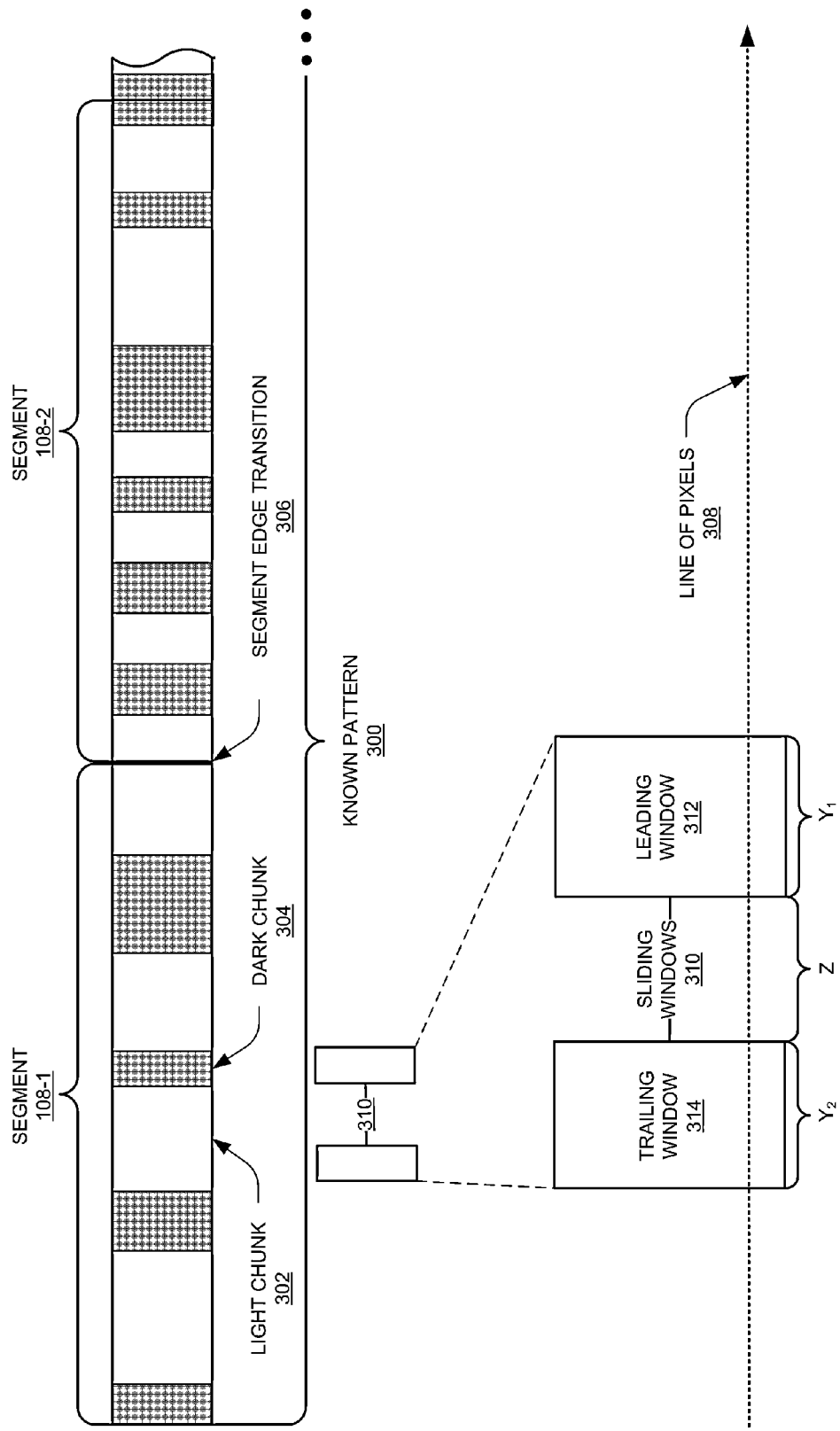

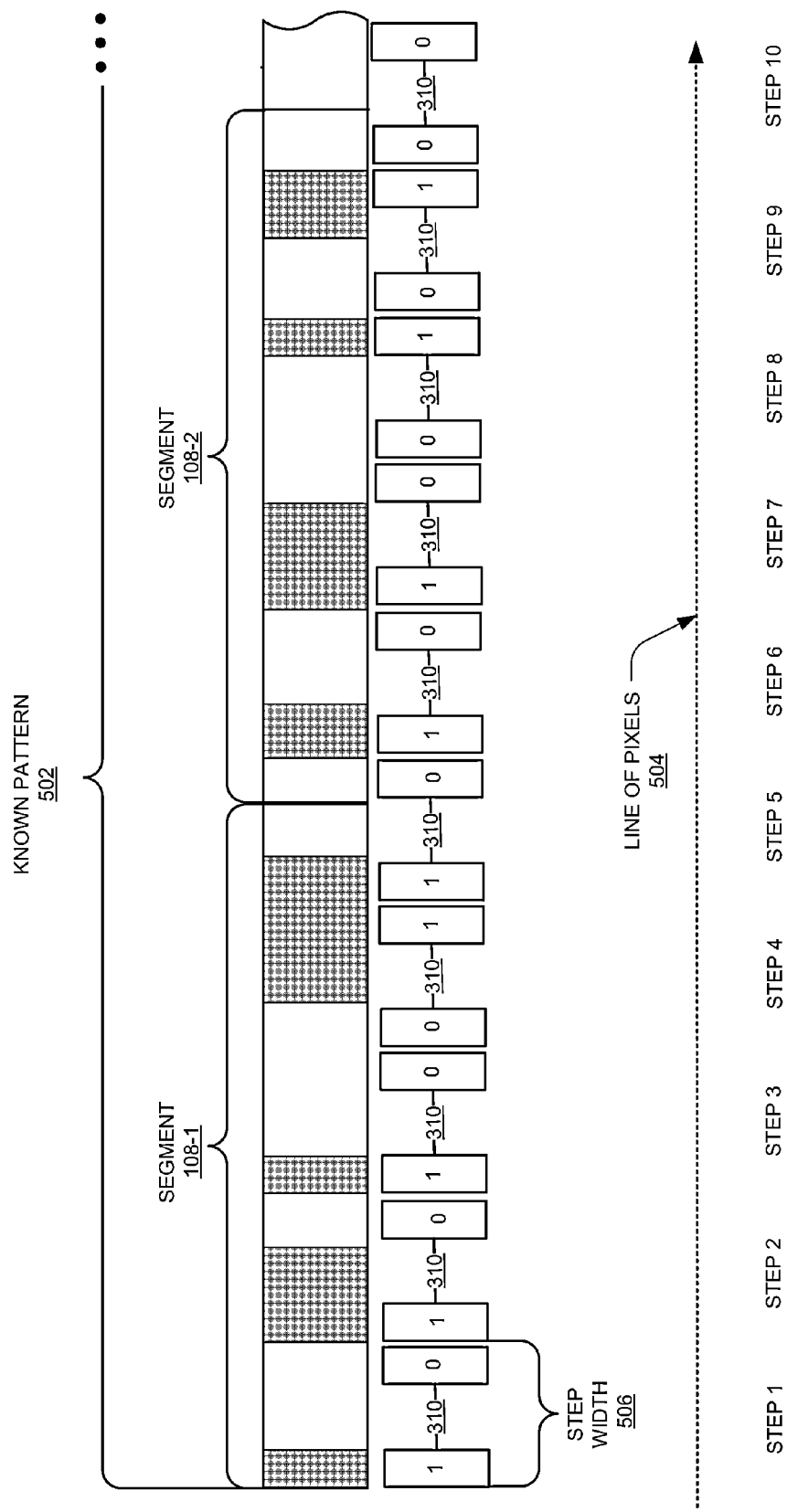

METHOD AND APPARATUS FOR DETECTION OF PATTERNS AND EDGES WITH UN-CALIBRATED DEVICES

CROSS REFERENCE TO RELATED APPLICATIONS

This claims priority to U.S. Patent Application No. 61/750,195, filed on Jan. 8, 2013, which is incorporated herein by reference.

BACKGROUND

Modern optical scanners, such as flatbed scanners, generally employ a moveable sensor bar (e.g., scan head, scan bar), that as part of a scanning operation, moves under a transparent surface where an object (e.g., document, image) has been placed for scanning. However, when the scanner is disabled (e.g., power turned off, power failure), the sensor bar is commonly at an unknown location somewhere along the scanner.

Therefore, upon initialization (e.g., power-up) of the scanner, the location of the sensor bar is unknown. The location of the sensor bar must be determined at a known location so that the scanner can, for example, initiate sensor calibration procedures (e.g., compensate for lighter and darker portions of the scan head), and determine a known location of a top or a bottom of the transparent surface to prepare for a scanning operation.

Contact sensors (e.g., physical location sensors, contact switches, optical location sensors) are sometimes used in scanners to detect when a sensor bar has reached a known (or predetermined) location. Such a known location may be commonly referred to as a "home" location or a location that is relative to a "home" location. However, employing one or more contact sensors adds manufacturing cost to a scanner. Additionally, failure of a contact sensor would prevent a scanner from finding a known location of the sensor bar. Moreover, the sensor bar could be moved past a defective contact sensor to an end of an internal chamber of the scanner, where the motor would continue to run even though the sensor bar cannot be moved any further. This could potentially damage the motor used to drive the sensor bar.

SUMMARY

In various embodiments, the present disclosure provides a method and apparatus for determining a position of a scan head in a scanning unit, such that the scan head is positioned at a known location in the scanning unit based at least in part on adjusting parameters of a first window and a second window to correspond to edges of a known pattern at the known location; moving, in accordance with the adjusted parameters, (i) the first window in steps along a line of pixels detected by the scan head and (ii) the second window in steps along the line of pixels detected by the scan head; at each of the steps, determining (i) an average value of pixels of the line of pixels in the first window and (ii) an average value of pixels of the line of pixels in the second window; in at least a subset of the steps, determining edges in the line of pixels detected by the scan head based at least in part on a difference between the average value in the first window and the average value in the second window being greater than or equal to a predetermined threshold; and determining a correlation between (i) the edges in the line of pixels detected by the scan head and (ii) the edges of the known pattern, wherein the correlation between (i) the edges in the line of pixels detected by the scan head and (ii) the edges of the known pattern corresponds to the scan head being positioned at the known location in the scanning unit.

This Summary and the following sections, including the section headings, are merely illustrative implementations and embodiments and should not be construed to limit the scope of the claims.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 2 is a block diagram showing intensity variations of scan head segments.

FIG. 3 is a diagram illustrating detection of a known pattern of a scanner.

FIG. 5 is a diagram illustrating detection of a known pattern of a scanner.

DETAILED DESCRIPTION

The present disclosure describes techniques for determining a location of a scan head in, for example, an optical scanner. The techniques described herein provide for moving a scan head to a known (e.g., home) location without relying on one or more contact sensors to detect the location of the scan head. Upon initialization of a scanner, the scan head is moved rapidly to quickly detect a known pattern at a known location in the scanner. As the scan head is moved, windows moving along lines of pixels detected by the scan head are used to perform pixel averaging to detect the known pattern in the scanner. Parameters associated with the windows custom fit the windows to the known pattern to facilitate rapid and accurate detection of the known pattern and determine a known location of the scan head to facilitate calibration of the scanner.

Figure 1:
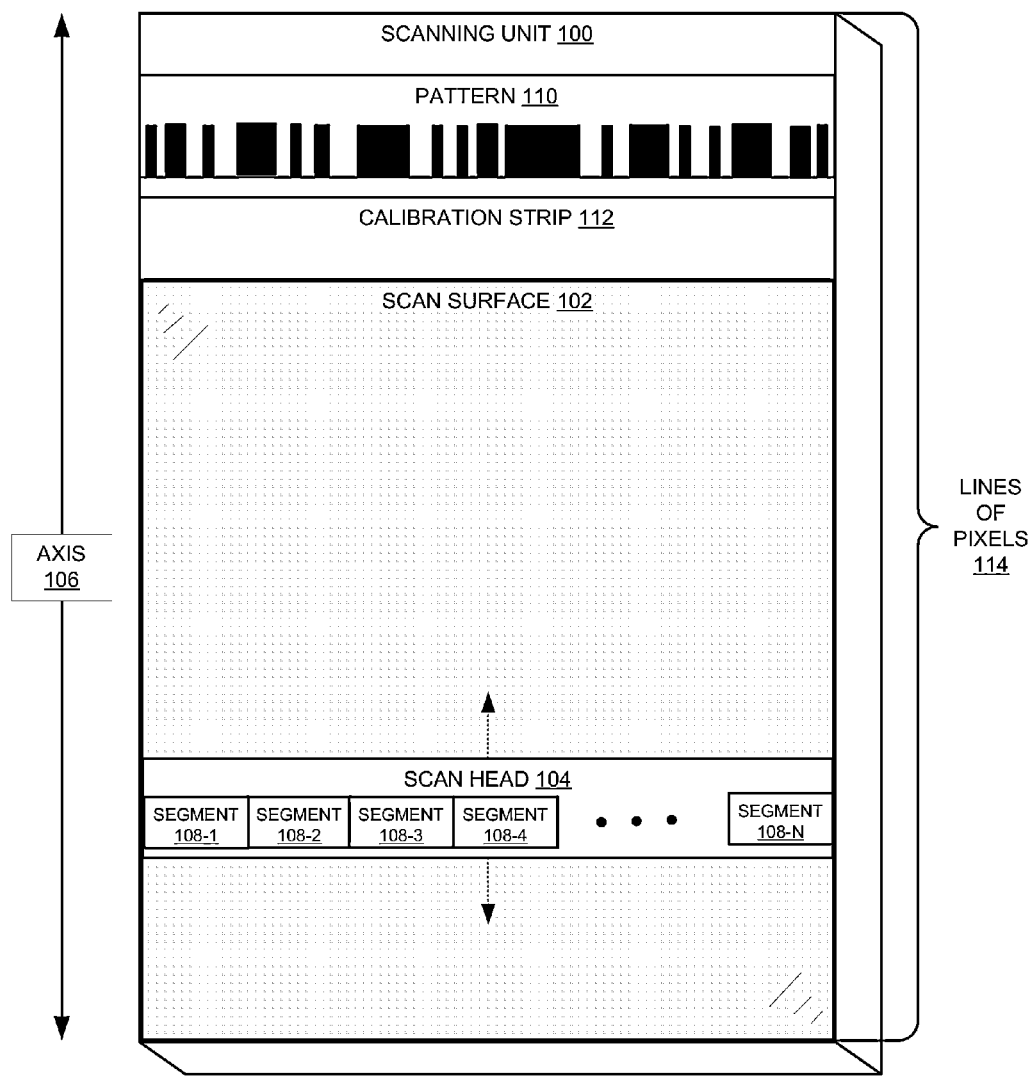
FIG. 1 is a simplified representation of a scanning unit.

FIG. 1 illustrates an example scanning unit 100 (e.g., an optical image scanner) in accordance with various embodiments of the present disclosure. Scanning unit 100 may comprise a stand-alone scanner, such as a flatbed scanner or an automatic document feed (ADF) scanner. Furthermore, certain embodiments may comprise components or sub-components of an image scanner.

In the example configuration illustrated in FIG. 1, scanning unit 100 has a scan surface 102 where paper, photos or other objects are placed for scanning. Scanning unit 100 may also have a hinged lid (not shown) that closes to cover at least scan surface 102. Scan surface 102 is generally a translucent surface (e.g., glass).

Scan head 104 (e.g., a sensor head on a moveable scan bar) is generally located under scan surface 102. A motor and drive mechanism (not shown) moves scan head 104 back and forth under scan surface 102 in directions along axis 106 of scanning unit 100. For simplicity of discussion, scan head 104 will be referred to as moving between an internal top and bottom of scanning unit 100.

FIG. 1 shows scan head 104 as including various segments 108-1 to 108-N. As an example, scanning unit 100 utilizes a sensor (e.g., scan head), such as a contact image sensor (CIS), such that segments 108-1 to 108-N represent various segments of the CIS. The sensor is used to scan pixels, such as lines of pixels, associated with an object placed on scan surface 102 for scanning. As another example, segments 108-1 to 108-N correspond to regions associated with a charge-coupled-device (CCD) sensor, that commonly use moveable mirrors and a moveable light source incorporated with scan head 104 to transmit reflected light to the CCD to facilitate a scanning process. In various embodiments, segments 108-1 to 108-N can be associated with regions of scan head 104 associated with other techniques used for scanning.

For purposes of discussion and not limitation, segments 108-1 to 108-N will be described in the context of segments (e.g., segments of a silicon wafer) of a contact image sensor (CIS) of scan head 104. In this context, scan head 104 further includes various lights (e.g., light emitting diodes (LEDs), not shown) to illuminate an object for scanning placed on scan surface 102.

During a scanning operation, scan head 104 moves across (e.g., up and down) scan surface 102 such that segments 108-1 through 108-N detect lines of pixels corresponding to an object being scanned. For example, for operation at a scan resolution of 1200 dots-per-inch (dpi), segments 108-1 through 108-N detect 1200 lines of pixels (e.g., each line including 1200 pixels) over each inch that scan head 104 is moved under scan surface 102, as well as other regions of scanning unit 100. Thus, greater processing power is required as a function of scan resolution to detect and process each line of pixels as scan head 104 is moved at higher speeds.

In various embodiments, scanning unit 100 does not maintain a location of scan head 104 in non-volatile memory, such that upon initial power up and/or activation, scanning unit 100 may not know a current location of scan head 104 along axis 106. As an example, scanning unit 100 does not incorporate one or more contact sensors (e.g., physical location sensors) used to determine a location of scan head 104. Scan head 104 could be located at any position between an internal top and bottom of scanning unit 100 along axis 106. To facilitate a self-calibration technique, scan head 104 must be positioned to a known location (e.g., a known home location) along axis 106 within an internal region of scanning unit 100.

As an example, pattern 110 (e.g., a known pattern) is located on an internal surface of scanning unit 100 outside of the top region of scan surface 102. From the location shown in FIG. 1, scan head 104 is driven up above scan surface 102 to detect pattern 110. Logic in scanning unit 100 (not shown) is configured to detect pattern 110, for example, in a line of pixels detected using segments 108-1 through 108-N. In various embodiments, when a sensor and logic associated with scan head 104 detects pattern 110, a known position is determined for scan head 104.

As an example, upon initialization of scanning unit 100, logic is used in conjunction with pixels detected by segments 108-1 through 108-N to determine if scan head 104 is located over pattern 110. If a determination is made that scan head 104 is not located over pattern 110, scan head 104 is moved (e.g., stepped by 1 or multiple lines of pixels) up and/or down until pattern 110 is detected.

If upon initialization of scanning unit 100, scan head 104 is at the bottom of scanning unit 100, then moving scan head 104 down against the bottom wall of scanning unit 100 can put stress on the motor and other drive mechanisms used to move scan head 104. Likewise, moving scan head 104 up when it is at the top of scanning unit 100 (e.g., above pattern 110) can put stress on the motor and other drive mechanisms used to move scan head 104. Therefore, the initial movements of scan head 104 should be of limited duration and distance.

As an example, if scan head 104 is located at the top of scanning unit 100, with the distance between the top of scanner and pattern 110 known, scan head 104 can be moved down the known distance where a determination is made as to whether pattern 110 is detected. If pattern 110 is not detected (e.g., scan head 104 is not located above pattern 110), scan head 104 is moved up until pattern 110 is detected. Likewise, if scan head 104 is located below pattern 110, moving scan head 104 down the known distance will not result in detection of pattern 110, resulting in scan head 104 being moved up until pattern 110 is detected.

Thus, scan head 104 is moved until pattern 110 is detected. As an example, once pattern 110 is detected, scan head 104 is positioned to a known (e.g., home) position within or relative to pattern 110. As an example, with scan head 104 at a known position, scanning unit 100 can know how far to move scan head 104, for example, to a top or bottom of scan surface 102 to prepare for a scanning operation.

As an example, pattern 110 consists of numerous lines of pixels (e.g., 100 lines) in the vertical y-axis (i.e., axis 106) direction. Having pattern 110 consist of numerous lines of pixels provides for several advantages. As an example, due to manufacturing tolerances, scan head 104 may be tilted along its horizontal axis relative to an alignment of pattern 110. Thus, if pattern 110 has a height of x lines of pixels, only h times x lines may be detectable, where h 1. Additionally, in an attempt to find pattern 110 more quickly, scan head 104 may be stepped M lines at a time (e.g., M=10, 20, etc.). If pattern 110 does not consist of numerous lines of pixels, pattern 110 could be missed when scan head 104 is stepped M lines at a time.

In practical terms, it is desirable to scan very quickly and thus, finding the home location for scan head 104 should not be a time-consuming process. As an example, scanning unit 100 could have been powered off while scan head 104 is at the bottom of scanning unit 100, so the entire length of scanning unit 100 (e.g., 11.5" on a small scanner, 17" or more on a larger scanner) might have to be scanned in order to find the home location. Scanning at a normal high resolution speed can tax the patience of a user. When scanning quickly, often only one line out of every M lines (e.g., M determined on a product by product basis) are scanned—otherwise, scan head 104 may move significantly faster than the scan subsystem has time to scan and process the data. In this case, processing logic in scanning unit 100 may not be able to keep up with scan head 104. If pattern 110 is only a couple of lines tall, it could easily be missed by scanning one line out of every M lines. Also, if pattern 110 is skewed with respect to scan head 104, a pattern 110 that is a few lines in height might be missed.

Another advantage for having pattern 110 have multiple lines of height is for reconfirming pattern detection at multiple locations of scan head 104 to avoid a situation where a complex image being scanned happens to duplicate pattern 110 by random chance. In this situation, it is highly unlikely that a generic image would have a multiple line duplication of pattern 110. Once pattern 110 is detected, the home location of scan head 104 can be determined at a predetermined location (e.g., middle, top, bottom) relative to pattern 110.

Scanning unit 100 can also include a calibration strip 112. As an example, calibration strip 112 is a "pure" white strip on an internal surface of scanning unit 100 at a known location relative to pattern 110. Calibration strip 112 can be used to determine average variations between each of segments 108-1 through 108-N of a sensor associated with scan head 104, as is described in greater detail herein. Additionally, calibration strip 112 can be used to calibrate individual pixel values detected by the scan head, such that compensation values can be added or subtracted to each pixel detected by the scan head to, for example, normalize pixel values detected by the scan head to compensate for variations of sensors positioned on the scan head. Moreover, such calibration further enhances the accuracy and speed of subsequent searches for finding pattern 110. As scan head 104 is moved, a sensor (e.g., segment 108-1 through segment 108-N) is used to detect lines of pixels 114. As an example, lines of pixels 114 are associated with a current scan resolution (e.g., 300 dots per inch (DPI), 1200 DPI, etc.) of scanning unit 100. In various embodiments, lines of pixels 114 are horizontal lines of pixels that are substantially perpendicular to axis 106. Scan head 104 can be moved, for example, from at least a bottom of scan surface 102 to a location above pattern 110 to detect lines of pixels 114.

In various embodiments, when scan head 104 is positioned over a portion of pattern 110, pattern 110 is detected via analysis of a single line of pixels. In various other embodiments, when scan head 104 is positioned over a portion of pattern 110, pattern 110 is detected via analysis of multiple lines of pixels. As an example, pattern 110 is constant along its vertical height. Therefore a portion (e.g., initial portion, sub portion) of pattern 110 is detected in a first line of pixels, and a remaining portion is detected in one or more subsequent lines of pixels, such as, when scan bar 104 is moved.

FIG. 2 illustrates an example of segment analysis with segments 108-1 through 108-N on scan head 104 aligned over calibration strip 112. As an example, each segment 108 detects 100 pixels of a line of pixels 202 detected at calibration strip 112, such that the detected pixel values are averaged and stored for each segment. As an example, 100 pixels detected by segment 108-1 are averaged to yield a value of 90H (i.e., 90 hexadecimal); 100 pixels detected by segment 108-2 are averaged to yield a value of E5H; and 100 pixels detected by segment 108-3 are averaged to yield a value of A5H. Thus, using calibration strip 112, based on average pixel values calculated for each of segments 108-1 through 108-N, segment 108-1 may be considered a "dark segment", while segment 108-2 is lighter, and segment 108-3 is lighter still. In various other embodiments, variations are determined between individual pixels in line of pixels 202 detected by segments 108-1 through 108-N when scan head 104 is aligned over calibration strip 112. These variations can be used to calibrate (e.g., normalize) individual pixels in line of pixels 202 detected by segments 108-1 through 108-N. Thus, as part of this calibration process, values are stored that are added or subtracted to pixels detected by segments 108-1 through 108-N during a scanning process (as well as a pattern 110 detection process) to compensate for manufacturing differences between and across segments 108-1 through 108-N.

As shown in FIG. 2, there are visible edge transitions between segment 108-1 and segment 108-2 as well as between segment 108-2 and segment 108-3. Since edge transitions between segments can be confused with edges in pattern 110, a-priori knowledge of edge transitions between segments, as well as average pixel values for each segment, can be used during detection of pattern 110, as these known values can be compensated for during a pattern edge detection process. Without compensating for these known values, edge transitions between segments can result in false negatives, and/or false positives when determining edges in pattern 110. Thus, compensating for edge transitions between segments when detecting edges in pattern 110 improves pattern detection performance.

As an example, average pixel values and/or normalized pixel values are determined and maintained for each segment 108-1 through 108-N when scan head 104 is positioned over calibration strip 112. In various embodiments, these average pixel values and/or normalized pixel values are used to normalize pixel measurements for each corresponding segment during detection of pattern 110. As an example, during detection of pattern 110, pixels measured in or by segment 108-1 are offset, adjusted and/or corrected based on, for example, the value 90H measured at calibration strip 112. Based on their corresponding average values measured at calibration strip 112, similar offsets, adjustments and/or corrections are made for pixels measured at or by each of segments 108-2 through 108-N during detection of pattern 110. As another example, individual pixel values are normalized by adding or subtracting compensation values determined during a calibration procedure using calibration strip 112. These adjustments, compensation values and/or corrections facilitate more accurate and/or faster subsequent detections of pattern 110. In general, segment (as well as pixel) variations fall within a known tolerance range, such that the dark regions of pattern 110 are significantly darker than average pixel values of, for example, a "dark segment", such as segment 108-1. Thus, the known tolerance range can be used to determine a threshold value between averages in trailing window 314 and leading window 312 to facilitate an initial detection of pattern 110 before a pixel calibration process has been performed. If a segment has an average pixel value measured at calibration strip 112 that is very close to a dark region of pattern 110, then the sensor, such as a CIS, is defective and would most likely need to be replaced.

FIG. 3 illustrates an example of using sliding windows to detect a known pattern, such as pattern 110, in an un-calibrated scanning unit. FIG. 3 illustrates a part of a known pattern 300 (e.g., portion of pattern 110) associated with segment 108-1 and segment 108-2. Known pattern 300 consists of light chunks, such as light chunk 302, and dark chunks, such as dark chunk 304. As an example, edges in known pattern 300 include transitions from light chunks to dark chunks, and from dark chunks to light chunks. As another example, edges in known pattern 300 include transitions from light chunks to dark chunks themselves. A segment edge transition 306 is illustrated as a segment transition between average pixel vales measured in segment 108-1 (e.g., 90H) and average pixel vales measured in segment 108-2 (e.g., E5H), for example, as measured using calibration strip 112, as described herein. However, in an un-calibrated scanning unit, variations between segments, as well as segment edge transitions, are unknown.

As an example, prior to calibration of segments 108-1 through 108-N, scan head 104 is positioned over a known pattern 300 (i.e., pattern 110), and sliding window 310 is used to facilitate detection of known pattern 302 by calculation of pixel averages while stepping over a line of pixels 308 as seen at or by segments 108-1 through 108-N. For purposes of discussion, FIG. 3 illustrates detection of a known pattern 300 as detected by segment 108-1 (e.g., a dark segment) and segment 108-2 (e.g., a light segment). In various embodiments, as an example, for an initial (e.g., after power up) detection of pattern 110 in an un-calibrated scanning unit, pixel compensation values between and within segments are not know, and known threshold values (e.g., a difference between average pixel values in trailing window 314 and leading window 312 being at or above a pre-determined threshold during detection of an edge) are relied upon for detection of pattern 110 at its known location. FIG. 3 illustrates segment 108-1 as slightly shaded overall, relative to lighter segment 108-2, giving rise to the visible segment edge transition 306. These differences between segments are unknown prior to calibration of the scanning unit. In various other embodiments, when a calibration procedure for the scanning unit has been previously performed, known values (e.g., pixel compensation values) measured at calibration strip 112 for each of segments 108-1 through 108-N can be used to offset, adjust, correct and/or normalize pixel values detected by sliding window 310, such that segment edge transition 306, as well as any other segment edge transitions are ignored and/or not detected. Therefore, subsequent detections of pattern 110 can be simplified prior to performing a re-calibration procedure, as previously determined pixel compensation values can be utilized.

As an example, sliding window 310 includes a leading window 312 of width $Y_1$ and a trailing window 314 of width $Y_2$. Leading window 312 and trailing window 314 are shown separated by a distance Z, where $Z \geq 0$. In various embodiments, $Y_1$, $Y_2$ and Z are measured in numbers of pixels relative to line of pixels 308. Sliding windows 310 is stepped across line of pixels 308 associated with known pattern 300, where pixel averages are calculated for pixels of known pattern 300 in leading window 312 and in trailing window 314 at each step. As an example, sliding window 310 is stepped across line of pixels 308 associated with known pattern 300 by a step value "W", which is measured in a number pixels on line of pixels 308, where W 1 pixel. In various embodiments, parameters $Y_1$, $Y_2$, Z and W are configurable, such that they can be modified at any point prior to stepping the sliding windows 310 over line of pixels 308, as well as during stepping the sliding windows 310 over line of pixels 308. In general, parameters $Y_1$, $Y_2$, Z and W are modified to speed up detection of a pattern, such as known pattern 300, and/or to facilitate more accurate detection of known pattern 300 (e.g., distinct edge transition locations) in line of pixels 308.

Thus, as leading window 312 and trailing window 314 are stepped along a line of pixels 308, an average pixel value is calculated for each of leading window 312 and trailing window 314, for example, at each step. When calculated averages are significantly different (e.g., based on a predetermined difference threshold) between leading window 312 and trailing window 314, logic in scanning unit 100 determines that an edge has been detected in line of pixels 308. As an example, when the determination is made that an edge has been detected, the calculated average value in leading window 312 is considered a first threshold value, and the calculated average value in trailing window 314 is considered a second threshold value.

As another example, with leading window 312 located totally within dark chunk 304, and trailing window 314 located totally within light chunk 302, an edge is detected based on the average value calculated in trailing window 314 being at or above a first predetermined threshold, and the average value calculated in leading window 312 being at or below a second predetermined threshold. As an example, parameters $Y_1$, $Y_2$, Z and W are adjusted such that in a subsequent step, leading window 312 is located totally within the light chunk to the right of dark chunk 304, and trailing window 314 is located totally within dark chunk 304, such that a next edge is detected. In this example, an average is calculated in leading window 312 that is at or above the first predetermined threshold, with the average value calculated in trailing window 314 being at or below the second predetermined threshold.

In various embodiments, parameters $Y_1$, $Y_2$, Z and W are selected such that each edge, or desired edges, of known pattern 300 is detected in a similar fashion based on the predetermined first and second threshold values and/or the predetermined difference threshold value between average values calculated in leading window 312 and trailing window 314. In various embodiments, parameters $Y_1$, $Y_2$, Z and W, as well as predetermined threshold value(s), are selected such that edge detection, as well as detection of known pattern 300, is accomplished for an un-calibrated scanning unit.

As an example, the higher of the first and second threshold values is determined as a light chunk, such as light chunk 302, and the smaller of the first and second threshold values is determined as a dark chunk, such as dark chunk 304. However, this is not construed as a limitation, as larger pixel values may represent a dark chunk and smaller pixel values may represent a light chunk. To speed up the pattern detection process, window sizes $Y_1$ and $Y_2$, as well as separation distance Z are configurable. Additionally, instead of stepping just a single pixel at a time, a step size (i.e., W) of multiple pixels can be used. Therefore, parameters $Y_1$, $Y_2$ and Z of sliding window 310, as well as step size W, are configurable and modifiable in real time to facilitate detection of known pattern 300 in line of pixels 308.

For purposes of simplicity, the techniques described herein have focused on using a single line of pixels 308 for pattern detection at a particular line of pixels. However, sliding windows 310 simultaneously or disjointly averaging multiple lines of pixels for detection of pattern 300 is within the scope of this disclosure. In various embodiments, sliding windows 310 can be moved in a horizontal direction (e.g., parallel to axis 106) to detect horizontal edges, such that multiple lines can be scanned and buffered.

The size of leading window 312 can be a determining factor in the detection of edges in the pattern, such as pattern 300. In general, a thinner edge or a finer pattern (e.g., narrower chunk) can be detected with a smaller window. However, a smaller leading window 312 can necessitate a smaller step width W, or leading window 312 could miss a narrow edge or a fine pattern. However, a sufficiently small trailing window 314 might detect the narrow edge or fine pattern missed by leading window 312. Moreover, leading window 312 and trailing window 314 are not required to be the same size (e.g., $Y_1 \neq Y_2$), since the average value is calculated for each window, which provides the needed edge detection information. Additionally, the sizes of leading window 312 and trailing window 314 can vary throughout the pattern (e.g., edge) detection process.

As an example, an edge detection algorithm (e.g., implemented in scanning unit 100) starts with small windows to get starting averages, then window sizes (e.g., $Y_1$ and/or $Y_2$), window separation (e.g., Z) and/or step widths (e.g., W) can be changed (e.g., increased) to speed up the algorithm. Additionally, for example, when an edge is detected, window sizes can be decreased to pinpoint a specific location of a pattern edge. As another example, pixel values on line of pixels 308 can be inspected pixel by pixel using the leading and trailing window averages to determine their corresponding light chunk and dark chunk threshold values upon detection of an edge. Then window widths (e.g., $Y_1$ and $Y_2$), window separation (e.g., Z) and/or step width (e.g., W) can be modified to make it easier and faster to detect another edge in, for example, the leading window, while making sure that the passing already detected edge passes through the trailing window.

In various embodiments, refinements to pattern detection take into account the locations (e.g., segment edges, average value of pixels in segments, pixel compensation values) of the segments. As an example, post-processing and/or pre-processing is done to determine if an entire segment appears to be darker or lighter than adjacent segments, and the average of the affected pixels corresponding to each segment are offset by the average pixel value associated with each segment that detects the corresponding pixels. Thus, for subsequent detections of pattern 110, average values calculated in leading window 312 and/or trailing window 314 can be offset by the average pixel value associated with each segment that detects the corresponding pixels, or compensated pixel values can be used, assuming a calibration procedure has been previously performed during a current power-on cycle of scanning unit 100.

In various embodiments, overall patterns, such as known pattern 300 or pattern 110, contain a combination of coarse pattern(s) (e.g., detectable with larger values of parameters $Y_1$, $Y_2$, Z, and/or W), and/or fine pattern(s) (e.g., detectable with smaller values of parameters $Y_1$, $Y_2$, Z, and/or W). As an example, if a coarse pattern is detected in the overall pattern, parameters $Y_1$, $Y_2$, Z, and/or W are adjusted to determine whether the fine pattern is also detected in the overall pattern in a line of pixels. As such, one or more lines of pixels associated with a pattern are stored, for example, in a buffer, where multiple passes of sliding windows 310 can be performed to verify detection of an overall pattern.

In various embodiments, sliding window 310 is stepped across line of pixels 308 to detect an initial portion of known pattern 300. If the initial portion of the pattern is not detected, processing can continue to a next line of pixels, or skip to a next $M^{th}$ line of pixels (e.g., for integer M>1). This allows for faster pattern detection since an entire line of pixels is not evaluated to determine whether the line of pixels contains the pattern, and every line of pixels is not required to be scanned.

In various embodiments, if an initial pattern is detected, for example, via coarse and/or fine pattern detection, parameters $Y_1$, $Y_2$, Z, and/or W can be adjusted (e.g., by reducing $Y_1$, $Y_2$, Z, and/or W) to determine specific edge locations in the initial pattern. The specific determination of the actual edge locations is used to synchronize pattern detection logic with the detected pattern. Once synchronized, pattern detection can then continue over a remaining part of the pattern, where parameters $Y_1$, $Y_2$, Z, and/or W are adjusted based on known edges of the synchronized pattern. In various embodiments, parameters $Y_1$, $Y_2$, Z, and/or W are adjusted for some steps, certain steps, many steps and/or all steps as part of overall pattern detection. Thus, by adjusting parameters $Y_1$, $Y_2$ and/or Z of sliding windows 310, and/or step width W, patterns are accurately detected faster, relative to a consecutive pixel by pixel search.

Examples of pattern detection techniques are described herein. Using these pattern detection techniques, as well as other pattern detection techniques in any or all combinations is within the scope of this disclosure.

Figure 4A:
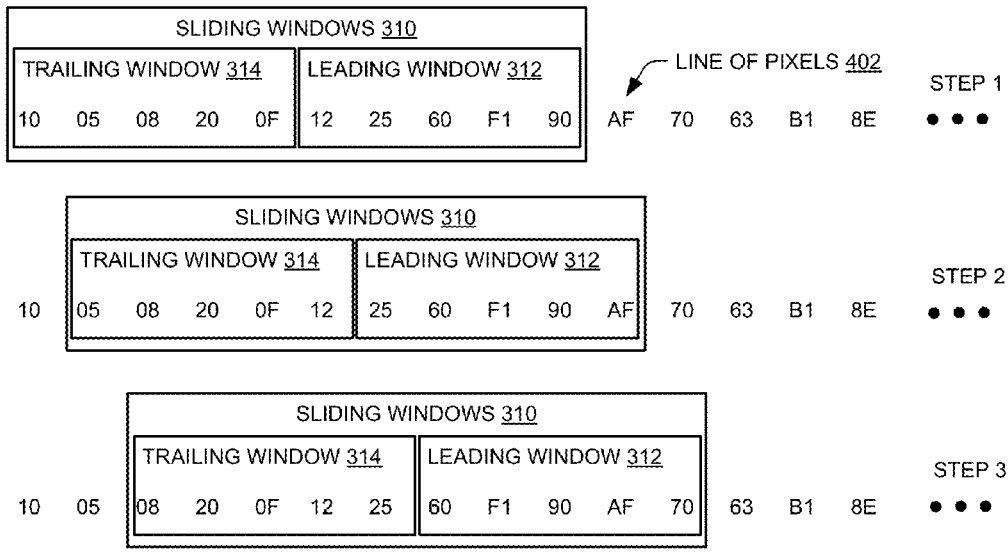
FIGS. 4A and 4B are diagrams illustrating detection of a known pattern of a scanner.

FIG. 4A is an example of using sliding windows 310 over steps to detect an edge in a line of pixels 402 associated with an overall pattern. As an example, line of pixels 402 is detected when scan head 104 is positioned over pattern 110 at a particular one of the lines of pixels 114.

Line of pixels 402 represent pixel values (e.g., 10, 50, 08, 0F, etc.) in a row of pixels in hexadecimal (HEX) format. In the example of FIG. 4A, sliding windows 310 includes leading window 312 with a width $Y_1$=5 pixels, trailing window 314 with a width $Y_2$=5 pixels, and a windows separation of Z=0 pixels. FIG. 4A illustrates three steps (e.g., step 1, 2 and 3), such that each step has a step width W=1 pixel. At each of steps, 1, 2 and 3, average pixel values are calculated for each of trailing window 314 and leading window 312.

At step 3 in FIG. 4A, an average of pixel values 60, F1, 90, AF and 70 is calculated for leading window 312, and an average of pixel values 08, 20, 0F, 12 and 25 is calculated for trailing window 314. In various embodiments, pattern edges are determined based on a magnitude of a difference between the average values calculated in each of trailing window 314 and leading window 312. As an example, at step 3 in FIG. 4A, the difference between the average values in the leading and trailing windows is a maximum difference and/or above a predetermined difference threshold. As another example, at step 3 in FIG. 4A, the average value calculated at trailing window 314 is at or below a second threshold, and the average value calculated at leading window 312 is at or above a first threshold, to signify detection of an edge. Thus, the average value calculated for leading window 312 is determined as a first threshold, and an average value calculated for trailing window 314 is determined as a second threshold. As an example, at step 3 in FIG. 4A, sliding windows 310 has detected an edge in line of pixels 402.

In various embodiments, when one of leading window 312 or trailing window 314 is sufficiently close (e.g., within 3%, 5%), equal to, or higher than the first threshold, and the other of the leading window 312 or trailing window 314 is sufficiently close (e.g., within 3%, 5%), equal to, or lower than the second threshold, a determination is made that leading window 312 and trailing window 314 are positioned in accordance with an edge. As an example, if leading window 312 is within (e.g., totally within) a light chunk. (e.g., light chunk 302), and trailing window 314 is within (e.g., totally within) a dark chunk (e.g., dark chunk 304), then sliding window 310 is determined to be positioned in accordance with an edge between a dark chunk and a light chunk. As an example, FF (hex) represents pure white, while 00 (hex) represents pure black, however, this is not construed to be a limitation. FF (hex) can represent pure black, while 00 (hex) can represent pure white, while swapping the relationships between the predetermined first and second threshold values.

Subsequent detection of edges in pixels at known locations associated with a known pattern (e.g., pattern 110) is used to determine whether, for example, scan head 104 is positioned over pattern 110, such that pattern 110 is detected. In various embodiments, parameters $Y_1$, $Y_2$, Z, and/or W are judiciously selected to facilitate detection of known edges and/or light chunks and dark chunks in a known pattern. In various embodiments, a known pattern (e.g., pattern 110) is designed to match with selected parameters $Y_1$, $Y_2$, Z, and/or W for sliding windows 310 to simplify detection of the known pattern by sliding windows 310.

As an example, referring to FIG. 4A, the known pattern and parameters $Y_1$, $Y_2$, Z, and/or W are judiciously selected such that trailing window 314 is averaging sufficiently low pixel values, and leading window 312 is averaging sufficiently high pixel values to determine, for example, that an edge is detected, as shown in step 3 of FIG. 4A. Stated another way, the known pattern and parameters $Y_1$, $Y_2$, Z, and/or W are judiciously selected such that trailing window 314 is not stepped into the larger values of pixels in line of pixels 402 before an edge is detected based relationships between the first threshold and the second threshold and average values determined in trailing window 314 and leading window 312. These relationships are maintained for detection of subsequent edges in a line of pixels associated with a known pattern.

As an example, knowledge of the known pattern (e.g., pattern 110) is very important, and the knowledge of the known pattern is "contained" in the parameters $Y_1$, $Y_2$, Z, and/or W associated with sliding windows 310. Parameters $Y_1$, $Y_2$, Z, and/or W are selected such that real edges (e.g., transitions between dark and light chunks and transitions between light and dark chunks) in the known pattern are not missed during pattern detection. In various embodiments, parameters $Y_1$ and/or $Y_2$ are selected to be small enough such that the smallest "chunk" (e.g., narrower of any light chunk 302 or dark chunk 304) in the known pattern is bigger than at least one of parameters $Y_1$ or $Y_2$ or both of parameters $Y_1$ and $Y_2$. Additionally, parameters Z and W are chosen, for example, such that leading window 312 is not stepped beyond a chunk of the known pattern before trailing window 314 fully detects the average value difference from a previous chunk of the known pattern. Thus, parameters $Y_1$, $Y_2$, Z, and/or W are selected such that leading window 312 and trailing window 314 fit into, for example, consecutive dark or light chunks of the known pattern, such that desired edges (e.g., all edges, specific edges, predetermined edges) of the known pattern are detected.

As an example, a determination is made that an edge has been detected in a known pattern when a difference between average pixel values calculated for leading window 312 and trailing window 314 is greater than or equal to a predetermined difference threshold. For an un-calibrated scanning unit, a predetermined threshold difference is selected that is low enough to reliably detect the edges of real dark chunks and real light chunks in the known pattern, and high enough to ignore variations in uncompensated pixel detection regions of segments as well as segment edge transitions, such as segment edge transition 306.

In various embodiments, parameters $Y_1$, $Y_2$, Z, and/or W are selected to optimize speed, memory requirements, detection of smaller edges, detection of larger edges, dust elimination and/or accuracy of edge detection for a known pattern.

Figure 4B:
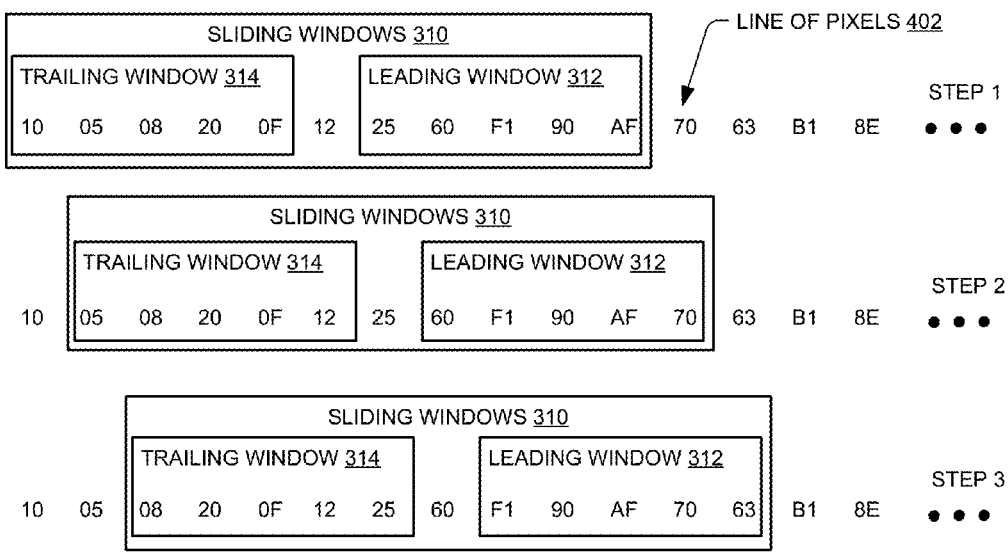

FIG. 4B is an example of using sliding windows 310 over steps to detect an edge in pixels of line of pixels 402 of an overall pattern. As an example, line of pixels 402 is detected when scan head 104 is positioned over pattern 110 at a particular one of the lines of pixels 114.

In the example of FIG. 4B, sliding windows 310 includes leading window 312 with a width $Y_1$=5 pixels, trailing window 314 with a width $Y_2$=5 pixels, and a windows separation of Z=1 pixel. FIG. 4B illustrates three steps (e.g., step 1, 2 and 3), such that each step has a step width W=1. At each of steps, 1, 2 and 3, average pixel values are calculated for each of trailing window 314 and leading window 312.

At step 2 in FIG. 4B, an average of pixel values 60, F1, 90, AF and 70 is calculated for leading window 312, and an average of pixel values 05, 08, 20, 0F and 12 is calculated for trailing window 314. In various embodiments, pattern edges are determined based on a magnitude of a difference between the average values calculated in each of trailing window 314 and leading window 312. As an example, at step 2 in FIG. 4B, the difference between the average values in the leading and trailing windows is a maximum difference that is equal to or above a predetermined difference threshold. Thus, the average value calculated for leading window 312 is determined as a first threshold, and an average value calculated for trailing window 314 is determined as a second threshold. At step 2, leading window 312 has detected an edge in line of pixels 402. Coincidently, at step 2 in FIG. 4B, the average value calculated for leading window 312 is above the first threshold calculated for leading window 312 at step 3 in FIG. 4A, and the average value calculated at step 2 in FIG. 4B for trailing window 314 is below the second threshold calculated for trailing window 314 at step 3 in FIG. 4A. Note that based on selection of parameters $Y_1$, $Y_2$, Z, and/or W, starting at the same point in pattern segment 402, that the edge in pattern segment 402 was found in fewer steps in FIG. 4B as compared to FIG. 4A.

FIG. 5 is an example illustrating using sliding windows 310 stepped over steps W (e.g., step width 506) to detect edges in pixels of a line of pixels 504 associated with a portion of known pattern 502. As an example, the portion of known pattern 502 represents a portion of pattern 110 associated with segment 108-1 and segment 108-2 when scan head 104 is positioned over pattern 110 in FIG. 1. In FIG. 5, sliding windows 310 is repeated to represent consecutive step positions of sliding windows 310 moved at step width 506 (e.g., W) across line of pixels 504. In the example of FIG. 5, step width 506 is shown slightly greater than $(Y_1+Y_2)+Z$ pixels wide (e.g., slightly greater than the overall width of sliding windows 310). Sliding windows 310 is shown stepped over steps 1-10 in FIG. 5.

Parameters $Y_1$, $Y_2$, Z, and W are selected for sliding windows 310 such that real edges (e.g., transitions between dark and light chunks and transitions between light and dark chunks) detected in line of pixels 504 are not missed during pattern detection of known pattern 502. As an example, for illustrative purposes, at step 1, sliding windows 310 shows a 1 at trailing window 314, representing that the average pixel value calculated at trailing window 314 is at or below a second threshold, while at step 1 sliding windows 310 shows a 0 at leading window 312, indicating that leading window 312 is at or above a first threshold. Additionally, the difference between average pixel values in trailing window 314 and average pixel values in leading window 312 is at or above the predetermined difference threshold. This indicates detection of an edge between a dark chunk and a light chunk in known pattern 502.

Similarly, based on parameters $Y_1$, $Y_2$, Z, and/or W selected for sliding windows 310, at step 2, sliding windows 310 detects another edge between a dark chunk and a light chunk in known pattern 502, based on values of 1 and 0 associated with trailing window 314 and leading window 312, respectively. Additionally, based on knowing that values of 1 and 0 were detected at both steps 1 and 2 by sliding windows 310, a determination is made that a light chunk to dark chunk edge transition exists between a location of sliding windows 310 between steps 1 and 2. Therefore, stepping sliding windows 310 at steps 1 and 2 indicate that three edge transitions in known pattern 502 have been detected.

Based on 1 and 0 values of sliding windows 310, a determination is made that there is an edge at step 3 and that there is not an edge between step 3 and step 4, as the associated values of 1 and 0 are reversed in sliding windows 310 between step 3 and step 4. Likewise, no edge is detected between step 4 and step 5, as well as between step 7 and step 8.

At step 8, a light chunk to dark chunk edge transition is detected. Likewise, based on 1 and 0 values of sliding windows 310 at step 8 and step 9, a dark to light edge transition is detected between step 8 and step 9. At step 10, sliding windows 310 has identical values of 0 for both leading window 312 and trailing window 314, indicating that there is no edge transition in line of pixels 504 associated with known pattern 502 at step 10.

As an example, a pattern of 1's in 0's in sliding windows 310 at steps associated with detection of known pattern 502 can be matched to a known pattern of 1's in 0's to determine if known pattern 502 has been detected. As another example, parameters $Y_1$, $Y_2$, Z, and/or W are selected such that for some steps of sliding windows 310, trailing window 314 and/or leading window 312 may be positioned between an edge in known pattern 502, such that trailing window 314 and/or leading window 312 do not determine average pixel values that are at or above the first threshold and/or at or below the second threshold. This is an allowable scenario as long as all edges that are desired to be detected in known pattern 502 are detected. As an additional example, parameters $Y_1$, $Y_2$, Z, and W are selected such that a first pass of lines of pixels 504 quickly detects, for example, only the larger chunks in known pattern 504, while parameters $Y_1$, $Y_2$, Z, and W are selected for one or more subsequent passes that detect other chunks (e.g., smaller chunks) in known pattern 502. By verifying that chunks are detected at locations where the chunks are known to exist in pattern 502, a determination is made that known pattern 502 has been detected.

Various pattern detection techniques as described herein can be used in any combination to verify whether a known pattern has been detected. Additionally, scan head 104 can be moved over pattern 110 multiple other times to detect other line of pixels to further verify that pattern 110 has been detected. As an example, scan head 104 can be moved to detect, for example, a top of pattern 110 and a bottom of pattern 110, and determine a home location for scan head 104 as half-way between the top and bottom of pattern 110. Determining a home location for scan head 104 relative to a detection of the location of pattern 110 at any location is within the scope of this disclosure.

Figure 6:
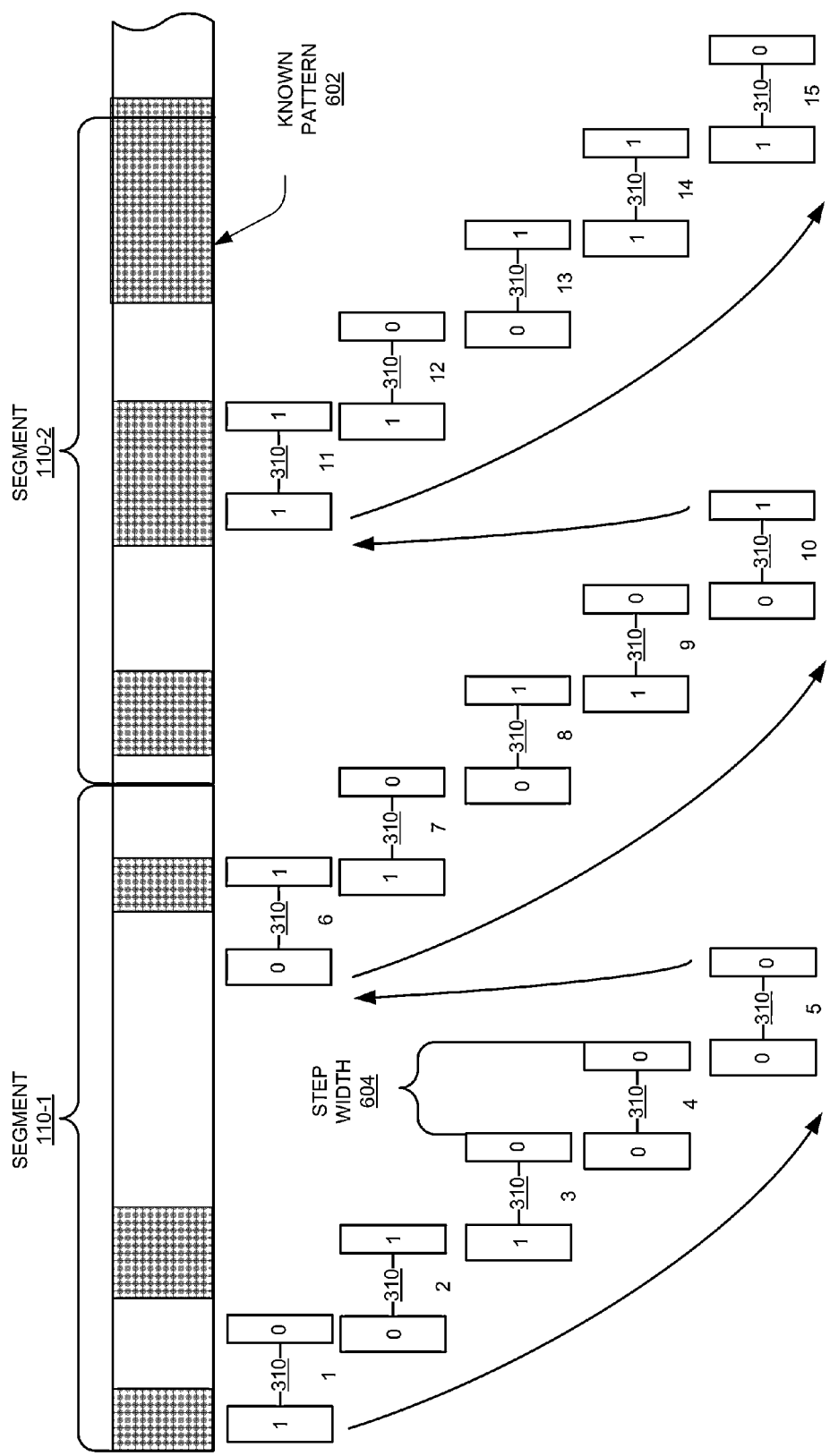
FIG. 6 is a diagram illustrating detection of a known pattern of a scanner.

FIG. 6 is another example illustrating, in an un-calibrated scanning unit, using sliding windows 310 over steps W to detect edges in a line of pixels associated with a portion of known pattern 602, for example, when scan head 104 is positioned over pattern 110 in FIG. 1. In FIG. 6, sliding windows 310 is repeated to represent consecutive step positions of sliding windows 310 moved at step width 604 (e.g., W) across a line of pixels corresponding to known pattern 602. In the example of FIG. 6, step width 604 is shown as less than the total width of sliding windows 310. Step numbers 1 through 15 are shown under each representation of sliding windows 310 to illustrate a position of sliding windows 310 at each corresponding step.

In the example of FIG. 6, a width of leading window 312 is illustrated as less than a width of trailing window 314 (e.g., $Y_1 < Y_2$). As similarly shown in FIG. 5, a 1 or zero is shown in each leading and trailing window of sliding windows 310 in FIG. 6 to show a relationship of average pixel values determined in the leading and trailing window relative to the first and second threshold.

As an example, at step 1, values of 1 and 0 in leading and trailing windows of sliding windows 310 indicate that a dark chunk to light chunk edge transition has been detected, while at step 2, values of 1 and 0 in leading and trailing windows of sliding windows 310 indicate that a light chunk to dark chunk edge transition has been detected. At steps 4 and 5, values of 0 in leading and trailing windows of sliding windows 310 indicate that no edge transition has been detected, and that at both steps 4 and 5, sliding windows 310 detects a light chunk. At step 6, a light to dark edge is detected. At step 7, pixels are averaged at an edge between segment 110-1 and segment 110-2 in leading window 312. In various alternate embodiments, if known a-priori by prior performance of a calibration procedure, as shown by the value 0 in leading window 312 at step 7, the first threshold value can be selected to account for variations between segment densities. Thus, the contribution of darker pixel values attributable to darker segment 110-1 still results in average pixel values calculated at leading window 312 that are at or above the first threshold. In various embodiments, this is performed by judicious selection of a threshold difference value that takes into account variations between segment and pixel densities.

As shown in FIG. 6, parameters $Y_1$, $Y_2$, Z, and W are selected such that all desired edges of known pattern 602 are detected. As an example, parameters $Y_1$, $Y_2$, Z, and/or W are selected such that for some steps of sliding windows 310, trailing window 314 and/or leading window 312 may be positioned between an edge in known pattern 602, such that trailing window 314 and/or leading window 312 do not determine average pixel values that are at or above the first threshold and/or at or below the second threshold. Note that the first threshold and the second threshold can be considered as a difference threshold, such that an edge is detected if the difference between the average value calculated for trailing window 314 and the leading window 312 is equal to or greater than the difference threshold. This is an allowable scenario as long as all edges that are desired to be detected in known pattern 602 are detected.

As an example, parameters $Y_1$, $Y_2$, Z, and W are selected such that a first pass of a line of pixels associated with known pattern 602 quickly detects, for example, only the larger chunks in known pattern 602, while different parameters $Y_1$, $Y_2$, Z, and/or W are selected for one or more subsequent passes that detect other chunks in known pattern 602. By verifying that chunks are detected at locations where the chunks are known to exist in pattern 602, a determination is made that known pattern 602 has been detected.

As shown in FIG. 5 and FIG. 6, knowledge of the known pattern is very important, and the knowledge of the known pattern is "contained" in the parameters $Y_1$, $Y_2$, Z, and W. Parameters $Y_1$, $Y_2$, Z, and W are selected such that desired real edges (e.g., transitions between dark and light chunks and transitions between light and dark chunks) in the known pattern are not missed during pattern detection. In various embodiments, parameters $Y_1$ and/or $Y_2$ are selected to be small enough such that the smallest "chunk" (e.g., narrower of any light chunk 302 or dark chunk 304) in the known pattern is bigger than at least one of parameters $Y_1$ and/or $Y_2$.

Additionally, as shown in FIG. 6, parameters $Y_1$, $Y_2$, Z, and W are chosen, for example, such that leading window 312 does not step beyond a chunk of the known pattern before trailing window 314 fully detects the average value difference from a previous chunk. In various embodiments, parameters $Y_1$, $Y_2$, Z, and W are chosen for sliding windows 310 such that leading window 312 is fully within a chunk (e.g., dark chunk 304), while trailing window 314 is fully within a previous chunk (e.g., light chunk 302) when average pixel values are calculated for each of the leading and trailing windows. In this manner, the difference between the average pixel values calculated for each of the leading and trailing windows at this position of sliding windows 310 is greater than or equal to the predetermined difference threshold. Then, sliding windows 310 are slid (e.g., moved, stepped, etc.) such that leading window 312 is fully within a next chunk (e.g., the adjacent chunk to the right of dark chunk 304) and trailing window is fully within its next chunk (e.g., dark chunk 304) when average pixel values are calculated for each of the leading and trailing windows. This assures that for each consecutive pairs of chunks, average pixel values are calculated at a subsequent step for each of the leading and trailing windows that have a difference that is greater than or equal to the predetermined difference threshold. In this manner, parameters $Y_1$, $Y_2$, Z, and W are chosen such that each edge in the known pattern can be detected.

Thus, parameters $Y_1$, $Y_2$, Z, and W are selected such that leading window 312 and trailing window 314 fit into desired dark and light chunks of the known pattern, such that edges (e.g., all edges, desired edges for a particular pass, edges associated with large chunks, edges associated with small chunks) of the known pattern are detected. Thus, when an edge has been found, all values (e.g., parameters $Y_1$, $Y_2$, $Z$, and/or W) can be modified to make it easier to detect another edge in the leading window while making sure the passing, already detected edge passes through the trailing window.

Referring back to FIG. 1, various techniques can be used to speed up detection of pattern 110 by a sensor of scan head 104. As an example, scan head 104 can be stepped, for example up, M lines of pixels (e.g., M>1) where detection of pattern 110 is attempted. At associated lines of lines of pixels 114, parameters $Y_1$, $Y_2$, $Z$, and W can be selected to attempt detection of just an initial portion of pattern 110, or just particular edges of pattern 110. If the initial portion and/or particular edges of pattern 110 are detected, parameters $Y_1$, $Y_2$, $Z$, and W can be changed to perform a more detailed scan to further verify that scan head 104 is located over pattern 110 and that pattern 110 is detected. When performing multiple scans of different lines of pixels associated with pattern 110, scan head 104 is stepped M lines of pixels 114 (e.g., M=10) to verify detection of pattern 110 for each of the multiple scans.

In various embodiments, dark chunks and light chunks in pattern 110 are constrained to be greater than 1 pixel wide, as dust or sensor related defects can often be 1 pixel wide. This, 1 pixel wide chunks are ignored, to further speed up processing and pattern detection accuracy.

Figure 7:
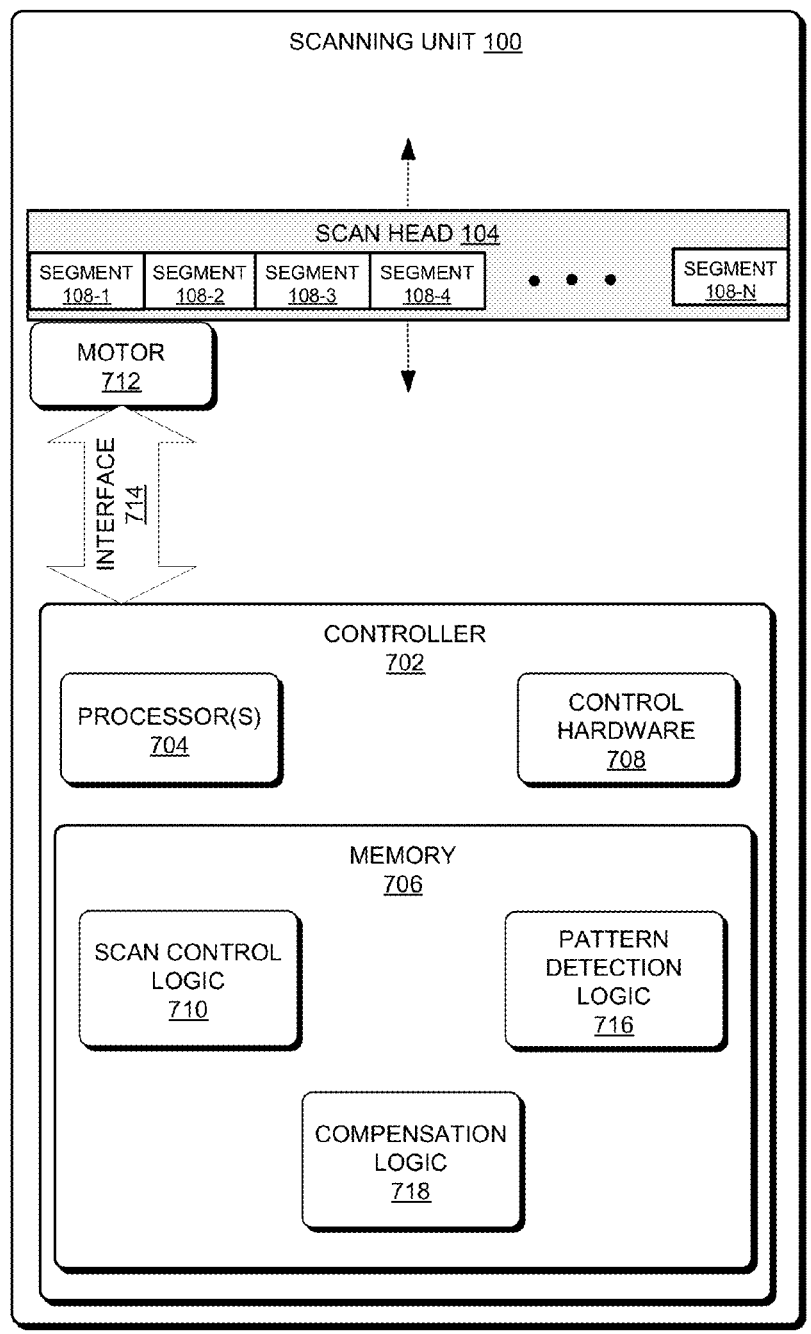
FIG. 7 is a block diagram illustrating various components of a scanning unit for performing detection of a pattern.

FIG. 7 is a schematic diagram of an example architecture for implementing the techniques described herein. Scanning unit 100 includes a controller 702. In this example architecture, controller 702 includes one or more hardware processors 704 (e.g., microcontroller, microprocessor, digital signal processor etc.) for processing instructions, such as instructions stored in memory 706. Controller 702 can also include control hardware 708 (e.g., application specific integrated circuit (ASIC), other hardware, etc.), to facilitate various operations (e.g., scanning operations) of scanning unit 100.

In this example architecture, memory 706 can include logic, such as scan control logic 710 (e.g., circuitry). Scan control logic 710 facilitates various scanning operations performed by scanning unit 100. Scan control logic 710 can work in conjunction with control hardware 708 to control, for example, motor 712 via interface 714 (e.g., ribbon cable, cable, direct interface), to move scan head 104. Scan control logic 710 is configured to position scan head 104 to process pixels detected by a sensor associated with scan head 104, such as segments 108-1 through 108-N.

Pattern detection logic 716 includes circuitry and/or instructions to facilitate detection of a known pattern, such as pattern 110. Pattern detection logic 716 can apply parameters (e.g., $Y_1$, $Y_2$, $Z$, and W) to, for example, sliding windows 310, to scan lines of pixels to detect a known pattern, store one or more lines of pixels in memory 706 for analysis, and interface with scan control logic 710 to direct various locations of scan head 104 as part of a pattern detection process, as described herein.

As an example, pattern detection logic 716 is configured to apply parameters to adjust a leading window and a trailing window to correspond to edges of a known pattern in a scanning unit, move the leading window and the trailing window (e.g., of sliding windows 310) in steps across the line of pixels detected by a scan head, at each of the steps across the line of pixels, determine an average value of pixels in the line of pixels in the leading window and an average value of pixels in the line of pixels in the trailing window, determine locations of edges in the line of pixels based at least in part on a difference between the average pixel values in the leading window and the average pixel values in the trailing window being greater than or equal to a predetermined threshold and determine that a location of the scan head corresponds to a location in the known pattern based at least in part on a correlation between the determined locations of the edges in the line of pixels and the edges of the known pattern. Pattern detection logic 716 is configured to adjust the parameters of the leading window and the trailing window to pinpoint one or more of the edges in the line of pixels. Pattern detection logic 716 is configured to modify the parameters of the leading window and the trailing window to reduce a number of the steps required to determine the locations of the edges in the line of pixels. Pattern detection logic 716 is illustrated as residing in memory 706 for illustrative purposes, as other configurations are within the scope of this disclosure. Pattern detection logic 716 can comprise circuitry (e.g., stand alone circuitry, ASIC) that can include its own memory separate from, or instead of, memory 706.

As an example, compensation logic 718 includes circuitry and/or instructions to facilitate determining an average intensity for each segment of the scan head by averaging pixel values detected over calibration strip (e.g., calibration strip 112) by each segment (e.g., segments 108-1 through 108-N.) Compensation logic 718 can further include circuitry and/or instructions to offset the determined average value of pixels in the line of pixels in the leading window and the determined average value of pixels in the line of pixels in the trailing window by the average intensity determined for each corresponding segment of the scan head. Compensation logic 718 can further include circuitry and/or instructions to compensate for variations in segment intensities as part of a normal scanning process. Compensation logic 718 can be configured to periodically or a-periodically determine when to perform a calibration sequence to compensate for variations between segment intensities. Compensation logic 718 can comprise circuitry (e.g., stand alone circuitry, ASIC) that can include its own memory separate from, or instead of, memory 706.

Memory 706 is an example of computer-readable storage media. Computer-readable media includes, at least, two types of computer-readable media, namely computer-readable storage media and communications media.

Computer-readable storage media includes volatile and non-volatile, removable and non-removable media (e.g., device) implemented in any method or technology for storage of information such as computer readable instructions, data structures, program modules, or other data. Computer-readable storage media includes, but is not limited to, RAM, ROM, EEPROM, flash memory, cache memory, or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer-readable storage media does not include communication media.

Figure 8:
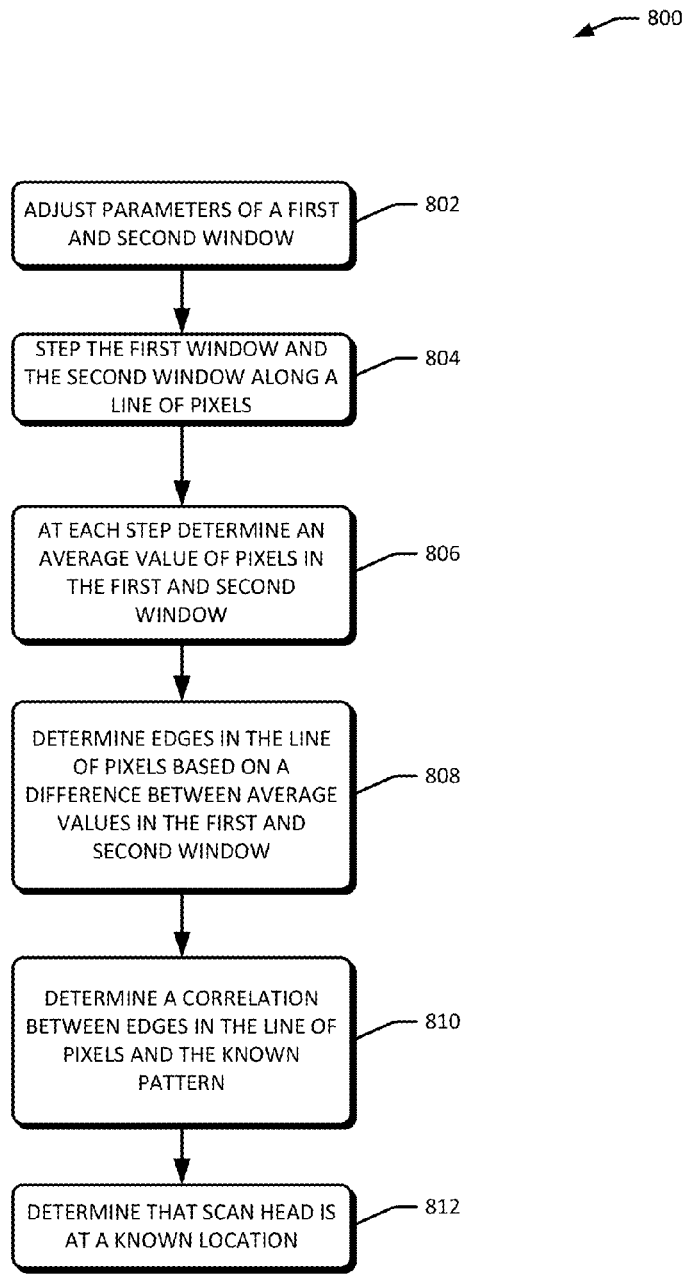
FIG. 8 is a block diagram illustrating an example method of detecting a pattern in a scanner.

FIG. 8 illustrates an example method 800 for determining a home location (e.g., location of pattern 110) of a scan head in an un-calibrated scanning unit. As an example, controller 702 moves scan head 104 along lines of pixels 114, M lines at a time (e.g., M 1), until pattern 110 is detected by scan head 104. As an example, controller 702 positions scan head 104 to various lines of pixels 114 within pattern 110 to determine that scan head 104 is positioned at a known location, such as a first known location within pattern 110. Once scan head 104 determines the first known location within pattern 110, scan head 104 can be moved to a second known location (e.g., 0.5 inches down) corresponding to the location of calibration strip 112 to facilitate an initial calibration of segments 108-1 to 108-N. Therefore, as an example, FIG. 8 illustrates an example method 800 for determining a location of pattern 110 in an un-calibrated scanner where variations between detected intensity of pixels by segments 108-1 through 108-N are unknown.

At 802, parameters of a first window and a second window are adjusted to correspond to edges of a known pattern at the known location. As an example, parameters $Y_1$, $Y_2$, Z, and/or W of sliding window 310 are adjusted to facilitate detection of edges (e.g., chunks) of pattern 110.

At 804, the first window and the second window are moved in steps along a line of pixels detected by the scan head. As an example, FIGS. 4A, 4B, 5 and 6 illustrate sliding windows 310 moved in steps along a line of pixels detected by the scan head 104.

At 806, at each of the steps, an average value of pixels of the line of pixels in the first window is determined, and an average value of pixels of the line of pixels in the second window is determined. As an example, FIGS. 4A and 4B illustrate pixels values that are averaged in leading windows 312 and trailing windows 314 at various steps.

At 808, in at least a subset of the steps, edges in the line of pixels are determined based at least in part on a difference between the average value in the first window and the average value in the second window being greater than or equal to a predetermined difference threshold. As an example, at step 3 in FIG. 4A, and at step 2 in FIG. 4B, the difference between the pixel values averaged in leading window 312 and trailing window 314 are greater than or equal to a predetermined threshold, indicating corresponding detection of edges.

At 810, a correlation between the edges in the line of pixels and the edges of the known pattern are determined. As an example, FIGS. 5 and 6 illustrate that edges detected in a line of pixels are correlated with edges of a known pattern to indicate that a known pattern has been detected. At 812, a determination is made that the scan head is at a known location, such as the first known location within pattern 110.

The location of the known pattern is at the known location on an internal wall of the scanning unit. As an example, as shown in FIG. 1, pattern 110 is at a known location within scanning unit 100. The parameters of the first window and the second window include a width of the first window, a width of the second window, a spacing between the first window and the second window and a step width for each of the steps for the moving of the first window and the second window along the line of pixels. As an example, parameters $Y_1$, $Y_2$, Z, and/or W of sliding window 310 correspond to parameters of leading window 312 and trailing window 314, as described herein. As described herein, adjusting of the parameters (e.g., $Y_1$, $Y_2$, Z, and/or W) changes one or more of the parameters during the moving of the first window and the second window in the steps along the line of pixels.

Additionally, adjusting of the parameters adjusts the width of the first window and the width of the second window to be less than the width of the smallest edge of the known pattern. As shown in FIGS. 5 and 6, the width of both leading window 312 and trailing window 314 are adjusted to be smaller than the width of the narrowest chunk, in known patterns 502 and 602, respectively. Adjusting the parameters is performed for reducing a number of the steps of the moving of the first window and the second window along the line of pixels. As an example, adjusting parameter Z=0 in FIG. 4A to Z=1 in FIG. 4B reduces the number of steps required to traverse line of pixels 402. This can be accomplished by increasing a width of the first or second window (e.g., $Y_1$ and/or $Y_2$), increasing a spacing (e.g., Z) between the first and second windows and/or increasing a step width (e.g., W).

Adjusting of the parameters can be performed for detecting a subset of the edges of the known pattern. As an example, parameters $Y_1$, $Y_2$, Z, and/or W can be adjusted to detect a first pattern in pattern 110, and then parameters $Y_1$, $Y_2$, Z, and/or W can be re-adjusted to detect a second pattern in pattern 110. For example, the first pattern includes larger chunks in pattern 110, which is detected rapidly, while the second pattern includes smaller chunks in pattern 110, which can be used to more accurately verify that pattern 110 has been detected.

Adjusting of the parameters can performed for pinpointing a location of one or more of the edges in the line of pixels. As an example, with parameter W=0, FIG. 4A illustrates a pinpointing of an edge in line of pixels 402.

For each of the at least the subset of the steps, the adjusting of the parameters is performed for fitting the first window within a corresponding edge of the known pattern, and fitting the second window within a corresponding previous edge of the known pattern. As an example, in FIG. 6, a subset of steps 1-15 (e.g., steps 1-3, 6-10, 12, 13 and 15) of sliding windows 310 detect edges in pattern 602. Notice that edges are detected when a leading window is within a first type of chunk and the trailing window is within a different second type of chunk. For example, in step 1 of FIG. 6, the leading window of sliding windows 310 is averaging totally within a light chunk of known pattern 602, while the trailing window of sliding windows 310 is averaging totally within a dark chunk of known pattern 602. This results in the difference between the average in leading and trailing windows to be at or above the predetermined difference threshold, thus signifying the presence of an edge at step 1 of FIG. 6.

As described herein, to improve a subsequent pattern detection, an average intensity for each segment of the scan head is determined. As an example, as shown in FIG. 2, scan head 104 is positioned over calibration strip 112 (e.g., which is at a known location relative to a known location in pattern 110), where average values of pixels are determined for each segment 108-1 through 108-N. As an example, the average value for each segment 108-1 through 108-N, (as well as locations of segment edges) is stored. These stored values are used to increase the speed and accuracy for subsequent pattern detection operations. As an example, in FIG. 3, average values associated with segment 108-1 and 108-2 (or pixel normalization values) are used to offset pixel averaging performed by sliding windows 310. As an example, the average value of pixels of the line of pixels in the first window is offset by the average intensity of the segment corresponding to the pixels in the first window and the average value of pixels of the line of pixels in the second window is offset by the average intensity of the segment corresponding to the pixels in the second window.

Note that the description above incorporates use of the phrases "in an aspect," "in an embodiment," or "in various embodiments," or the like, which may each refer to one or more of the same or different embodiments. Furthermore, the terms "comprising," "including," "having," and the like, as used with respect to embodiments of the present disclosure, are synonymous.

As used herein, the terms "logic," "unit," "component," and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although the present disclosure describes embodiments having specific structural features and/or methodological acts, it is to be understood that the claims are not necessarily limited to the specific features or acts described.

What is claimed is:

1. A method for determining a position of a scan head in a scanning unit, wherein the method comprises determining that the scan head is positioned at a known location in the scanning unit based at least in part on:
   adjusting parameters of a first window and a second window to correspond to edges of a known pattern at the known location;
   moving, in accordance with the adjusted parameters, (i) the first window in steps along a line of pixels detected by the scan head and (ii) the second window in the steps along the line of pixels detected by the scan head;
   at each of the steps, determining (i) an average value of pixels of the line of pixels in the first window and (ii) an average value of pixels of the line of pixels in the second window;
   in at least a subset of the steps, determining edges in the line of pixels detected by the scan head based at least in part on a difference between the average value in the first window and the average value in the second window being greater than or equal to a predetermined threshold; and
   determining a correlation between (i) the edges in the line of pixels detected by the scan head and (ii) the edges of the known pattern, wherein the correlation between (i) the edges in the line of pixels detected by the scan head and (ii) the edges of the known pattern corresponds to the scan head being positioned at the known location in the scanning unit.

2. The method of claim 1, wherein the location of the known pattern is at the known location on an internal wall of the scanning unit.

3. The method of claim 1, wherein the parameters of the first window and the second window include:
   a width of the first window;
   a width of the second window;
   a spacing between the first window and the second window; and
   a step width for each of the steps for moving of (i) the first window along the line of pixels detected by the scan head and (ii) the second window along the line of pixels detected by the scan head.

4. The method of claim 3, wherein adjusting of the parameters changes one or more of the parameters during moving of (i) the first window in the steps along the line of pixels detected by the scan head and (ii) the second window in the steps along the line of pixels detected by the scan head.

5. The method of claim 3, wherein adjusting of the parameters adjusts (i) the width of the first window to be less than the width of the smallest edge of the known pattern and (ii) the width of the second window to be less than the width of the smallest edge of the known pattern.

6. The method of claim 1, wherein adjusting of the parameters is performed for reducing a number of the steps of moving of (i) the first window in the steps along the line of pixels detected by the scan head and (ii) the second window in the steps along the line of pixels detected by the scan head.

7. The method of claim 1, wherein adjusting of the parameters increases a width of the first window for reducing a number of the steps of moving of (i) the first window in the steps along the line of pixels detected by the scan head and (ii) the second window in the steps along the line of pixels detected by the scan head.

8. The method of claim 1, wherein adjusting of the parameters increases a width of the second window for reducing a number of the steps of moving of (i) the first window in the steps along the line of pixels detected by the scan head and (ii) the second window in the steps along the line of pixels detected by the scan head.

9. The method of claim 1, wherein adjusting of the parameters is performed for detecting a subset of the edges of the known pattern.

10. The method of claim 1, wherein adjusting of the parameters is performed for pinpointing a location of one or more of the edges in the line of pixels detected by the scan head.

11. The method of claim 1, wherein for each of the at least the subset of the steps, the adjusting of the parameters is performed for (i) fitting the first window within a corresponding edge of the known pattern, and (ii) fitting the second window within a corresponding previous edge of the known pattern.

12. The method of claim 1, wherein the scan head is divided into segments that detect the line of pixels and wherein the method further comprises:
   positioning the scan head over a calibration strip of the scanning unit; and
   determining an average intensity for each segment of the scan head by averaging pixel values detected over the calibration strip by each segment.

13. The method of claim 12, wherein:
   the average value of pixels of the line of pixels in the first window is offset by the average intensity of the segment corresponding to the pixels in the first window; and
   the average value of pixels of the line of pixels in the second window is offset by the average intensity of the segment corresponding to the pixels in the second window.

14. A controller comprising:
   pattern detection logic configured to:
   apply parameters to adjust a leading window and a trailing window to correspond to edges of a known pattern in a scanning unit;
   move (i) the leading window in steps across a line of pixels detected by a scan head and (ii) the trailing window in the steps across the line of pixels detected by a scan head;

at each of the steps across the line of pixels, determine (i) an average value of pixels in the line of pixels in the leading window and (ii) an average value of pixels in the line of pixels in the trailing window;

determine locations of edges in the line of pixels based at least in part on a difference between the average pixel values in the leading window and the average pixel values in the trailing window being greater than or equal to a predetermined threshold; and determine that a location of the scan head corresponds to a location in the known pattern based at least in part on a correlation between (i) the determined locations of the edges in the line of pixels and (ii) the edges of the known pattern.

15. The controller of claim 14, wherein the parameters include:
    a width of the leading window;
    a width of the trailing window;
    a spacing between the leading window and the trailing window; and
    a step width of the steps.

16. The controller of claim 14, wherein the pattern detection logic is further-configured to modify the parameters of the leading window and the trailing window to reduce a number of the steps required to determine the locations of the edges in the line of pixels.

17. The controller of claim 14, wherein the pattern detection logic is further configured to adjust the parameters of the leading window and the trailing window to pinpoint one or more of the edges in the line of pixels.

18. The controller of claim 14, wherein the scan head is divided into segments that detect the line of pixels, and the controller further comprises:
    scan control logic configured to position the scan head over a calibration strip of the scanning unit;
    compensation logic configured to:
        determine an average intensity for each segment of the scan head by averaging pixel values detected over the calibration strip by each segment; and
        offset (i) the determined average value of pixels in the line of pixels in the leading window and (ii) the determined average value of pixels in the line of pixels in the trailing window by the average intensity determined for each corresponding segment of the scan head.

19. A non-transitory computer-readable storage media encoded with instructions, that when executed by one or more processors, perform acts comprising:
    applying parameters for adjusting a first window and a second window to correspond to edges of a known pattern that is at the known location in a scanning unit;
    moving, in accordance with the adjusted parameters, (i) the first window in steps along a line of pixels detected by a scan head of the scanning unit and (ii) the second window in the steps along the line of pixels detected by the scan head of the scanning unit;
    at each of the steps, determining (i) an average value of pixels of the line of pixels in the first window and (ii) an average value of pixels of the line of pixels in the second window;
    determining edges in the line of pixels based at least in part on a difference between the average value in the first window and the average value in the second window; and
    determining a correlation between (i) the edges in the line of pixels and (ii) the edges of the known pattern, wherein the correlation between (i) the edges in the line of pixels and (ii) the edges of the known pattern corresponds to the scan head being positioned at the known location in the scanning unit.

20. The non-transitory computer-readable storage media of claim 19, the acts further comprising determining that the scan head is positioned at the known location based at least in part on the correlation indicating a match between (i) the edges in the line of pixels and (ii) the edges of the known pattern.

* * * * *